United States Patent
Yoshiura et al.

(10) Patent No.: US 7,747,072 B2
(45) Date of Patent: Jun. 29, 2010

(54) IMAGE PROCESSING METHOD, IMAGE PROCESSING PROGRAM, ITS STORAGE MEDIUM, AND IMAGE PROCESSING DEVICE FOR EXTRACTING POINTS FROM A COLOR IMAGE

(75) Inventors: Takeshi Yoshiura, Ayabe (JP); Yukihiro Komatsu, Fukuchiyama (JP)

(73) Assignee: Omron Corporation, Kyoto-Shi (JP)

( * ) Notice: Subject to any disclaimer, the term of this patent is extended or adjusted under 35 U.S.C. 154(b) by 912 days.

(21) Appl. No.: 11/589,287

(22) Filed: Oct. 30, 2006

(65) Prior Publication Data
US 2007/0104363 A1 May 10, 2007

(30) Foreign Application Priority Data
Nov. 4, 2005 (JP) ............. 2005-321619

(51) Int. Cl.
G06K 9/00 (2006.01)
G06K 9/46 (2006.01)
G06K 9/66 (2006.01)

(52) U.S. Cl. ..................... 382/165; 382/190

(58) Field of Classification Search ............... 382/151, 382/154, 162, 164, 165, 173, 181, 190, 197, 382/199, 218–220
See application file for complete search history.

(56) References Cited

U.S. PATENT DOCUMENTS

| | | | | |
|---|---|---|---|---|
| 4,906,940 A * | 3/1990 | Greene et al. | ............... | 382/100 |
| 5,471,535 A * | 11/1995 | Ikezawa et al. | ............. | 382/199 |
| 5,604,820 A * | 2/1997 | Ono | ..................... | 382/190 |
| 5,734,743 A * | 3/1998 | Matsugu et al. | ............. | 382/154 |
| 5,956,420 A * | 9/1999 | Ikenoue | ..................... | 382/164 |
| 6,332,038 B1 * | 12/2001 | Funayama et al. | .......... | 382/190 |
| 6,453,069 B1 * | 9/2002 | Matsugu et al. | ............. | 382/173 |
| 6,542,639 B2 * | 4/2003 | Konoshima et al. | ......... | 382/218 |
| 6,839,465 B2 * | 1/2005 | Kaneko et al. | ............. | 382/190 |
| 2007/0104358 A1 * | 5/2007 | Komatsu | .................... | 382/151 |
| 2007/0104363 A1 * | 5/2007 | Yoshiura et al. | ............. | 382/165 |

FOREIGN PATENT DOCUMENTS

| | | |
|---|---|---|
| JP | 2002-230549 | 8/2002 |
| JP | 2004-133811 | 4/2004 |

* cited by examiner

Primary Examiner—Amir Alavi
(74) Attorney, Agent, or Firm—Foley & Lardner LLP

(57) ABSTRACT

Focusing on pixels that constitute a color image sequentially, color differences Cx and Cy in X and Y directions are found using image data in a mask centering around the focal pixel. For the pixel in which the sum of the color differences is not less than a predetermined value, a color difference is found in each of directions E1 and E2 that pass through the pixel and correspond to the first quadrant and the second quadrant in the X-Y coordinate system, and it is determined that the color change is generated in the direction having the larger color difference. Then, based on the determination result and the values of the color differences Cx and Cy, an angle (edge code) showing the direction of the color change is calculated.

6 Claims, 9 Drawing Sheets

IMAGE PROCESSING METHOD, IMAGE PROCESSING PROGRAM, ITS STORAGE MEDIUM, AND IMAGE PROCESSING DEVICE FOR EXTRACTING POINTS FROM A COLOR IMAGE

This application claims priority from Japanese patent application 2005-321619, filed Nov. 4, 2005. The entire content of the aforementioned application is incorporated herein by reference.

BACKGROUND OF THE INVENTION

1. Field of the Invention

The present invention relates to an image processing technique for a color image, and more particularly to an image processing method for recognizing a point positioned at the boundary between regions having different colors, a program for setting the function for executing the method in a computer, and an image processing device having the function for executing the method.

2. Description of the Background Art

When an object to be measured is to be detected by conventional monochrome gray image processing, an edge extracting process is performed in many cases. Furthermore, in order to perform the process with high precision, it is proposed by the applicant recently that angle data showing a density gradient direction (referred to as the "edge code" hereinafter) is found with respect to a point constituting an edge in an image (referred to as the "edge point" hereinafter) based on a density difference in each of a horizontal direction and a vertical direction.

For example, when an object having a predetermined outline configuration is to be extracted, a reference distribution pattern of the edge code is registered using a model image of the object previously and a region in which the edge code is distributed in a state similar to the reference distribution pattern is extracted in the image of the processing object (refer to, for example, Japanese Laid-Open Patent Publication No. 2002-230549: patent document 1). In addition, when a linear object is to be detected, after the edge point constituting the outline of the object has been specified using the edge code, a line is set along a direction perpendicular to the edge code (refer to, for example, Japanese Laid-Open Patent Publication No. 2004-133811: patent document 2).

Meanwhile, since the color image is provided such that image data of R, G and B are combined in general, when the process using the edge code is performed, it is necessary to convert color image data to monochrome gray image data.

However, in order to reflect the direction of the color change in the edge code correctly, since it is necessary to perform a converting process by which various kinds of colors are expressed by different densities, the calculation for the conversion becomes complicated and it takes time to perform the process.

Thus, it is necessary to consider a method for applying a calculating method of the edge code in the monochrome image to the color image.

While the edge code in the monochrome gray image shows the direction of the density change (density gradient direction), an edge is generated due to a largely change in color in the color image, so that it is believed that the direction of the color change is to be the edge code. That is, in the monochrome gray image processing, the amount of density change is found in the horizontal direction and the vertical direction and the edge code is calculated from the change amount, while in the color image processing, it is considered that amounts of color change (color difference) in the horizontal direction and the vertical direction are to be found instead of the amount of density change.

Here, a method for calculating the color difference will be described using a concrete example.

When the color is expressed as parameters of three primary colors R, G and B (referred to as the "color parameters" hereinafter), for example, each color is plotted to one point in Euclidean space (referred to as the "color space" hereinafter) having an axis of the color parameter. This color difference is expressed as a distance between two points in the color space.

For example, as shown in FIG. 9, in an image in which a X-Y coordinate system in which the horizontal direction is an X axis and the vertical direction is a Y axis, when it is assumed that image data of two adjacent pixels are (Ra, Ga, Ba) and (Rb, Gb, Bb), these colors are plotted to points A and B corresponding to the image data in the color space. In this case, the color difference CD between the pixels is found by the following formula [1].

[Formula 1]

$$CD=\sqrt{(Ra-Rb)^2+(Ga-Gb)^2+(Ba-Bb)^2} \quad [1]$$

Thus, it seems only necessary to find the color difference in the X and Y directions using the formula [1] instead of the density difference in the color image. However, since the value found by the formula [1] is always a positive value, the calculated edge code does not reflect the color change correctly.

The above problem will be described with reference to FIGS. 10 and 11. FIG. 10 shows a coordinate system for specifying the direction of the color change.

According to the conventional monochrome gray image processing, since the density difference having a positive or a negative value can be provided in both X and Y directions, the direction of the density change generated based on the edge point can be correctly expressed by arranging the edge point to the origin "O" of the coordinate system and setting a resultant vector of vectors showing the density difference in both X and Y directions. That is, the edge code found from the monochrome gray image is considered to be distributed all quadrants in the X-Y coordinate system in FIG. 10. Meanwhile, since the color difference in the case of the color image becomes 0 or a positive value, the edge code is limited to the range of the first quadrant.

FIG. 11 shows directions of the color change generated based on the pixel positioned in the center in a focal region (5 pixels×5 pixels) in which two kinds of colors are shown.

In the illustrated example, according to images G1 and G2, although the positions of two color regions (a gray region and a white region) are reversed, the position and inclination of the boundary is the same. Since there is no positive/negative relation between the colors, it is considered that the direction of the color change in the images G1 and G2 is the same and the color is changed along the direction from the lower left to the upper right in each image.

Meanwhile, according to an image G3, since the inclination of the boundary between color regions is different from that of the images G1 and G2, the direction of the color change is also different from that of the images G1 and G2.

However, according to the image G3, since only the same color difference value as that of the images G1 and G2 is provided, the edge code that reflects the difference in direction of the color change cannot be provided.

SUMMARY OF THE INVENTION

The present invention was made in view of the above problems and it is an object of the present invention that when a point positioned at the boundary between different colored regions in a color image is extracted as an edge point, the direction of the color change at the edge point can be correctly specified.

According to an image processing method in the present invention, an edge point positioned at the boundary between different colored regions in a color image is extracted. This method comprises a step A of setting a processing object region having a predetermined size and entering around a pixel that constitutes the color image to be processed, a step B of finding the magnitude of change in color difference in each of X and Y directions crossing perpendicularly in the pixel in the center of the processing object region using data of pixels in the region, a step C of finding the direction of a color parameter change generated based on the pixel in the center of the region in a processing object region in which the magnitude of the change in color difference in each of the X and Y directions found by the step B corresponds to the magnitude of the change in color difference recognized at the above boundary between the region having the different colors, based on at least one value of a color parameter among three independent color parameters showing color information of each pixel, and determining that the vector showing the direction of the change corresponds to which quadrant defined by the X and Y directions, a step D of specifying a direction of the change in color in the central pixel in the processing object region processed at the step C, using the determination result at the step C and the magnitude of the color change in the X and Y directions found at the step B and determining a vector showing the direction of the change corresponds to which quadrant in a coordinate system defined by the X and Y directions.

In addition, although the horizontal direction of the image may be set to the X direction and the vertical direction thereof may be set to the Y direction in this method, the present invention is not limited to this.

Here, the color is expressed as three independent color parameters and a color difference between one color and the other color expressed as a difference in values defined by the color parameters. The "magnitude of the color change" includes the magnitude of the color difference between specific pixels, or a calculated value when gradient is found by dividing the magnitude of the color difference between pixels by the distance between those pixels in the screen or a value corresponding to the distance. In addition, in the color space in which the three independent color parameters can be provided as three-dimensional coordinates, one color and the other color may be plotted and the distance between them may be the color difference. The color parameter may be used in accordance with RGB representation, XYZ representation system, L*a*b* color system, L*C*H* color system, HSV representation system and the like.

In addition, the process for finding the magnitude of change in color difference in the pixel positioned in the center of the processing object in each of the two orthogonal directions X and Y using the data of each pixel in the region includes a case where the magnitude of change in color difference is found by weighing the pixel in the processing object region based on the relative positional relation in the X and Y coordinates.

At the step A, the processing object region centering around the focal object pixel is set such that the number of pixels in the X direction is the same as that in the Y direction. At the step B, the magnitude of the change in color difference is found in each of the X and Y directions with respect to each pixel having the three independent color parameters (R, G and B, for example) in the processing object region based on the above idea.

At the step C, the process of "finding the direction of a color parameter change generated based on the pixel in the center of the region, based on at least one value of a color parameter among three independent color parameters showing color information of each pixel in a processing object region" includes a case where the numeric value of one color parameter is used, a case where two or three numeric values of the three color parameters are compared to extract the direction of the color parameter having the largest magnitude of change, or a case where the direction provided by weighing the magnitude of the change and synthesizing two or three numeric values of the three color parameters is extracted.

In addition, at the step C, although it may be determined that the vector showing the direction of the change in color in the processing object region corresponds to which range of the first to fourth quadrants shown in FIG. 10, the present invention is not limited to this. The range for determination may be limited to the first and second quadrants. Because, as described above, since there is no positive/negative relation in the color, like the images G1 and G2 in FIG. 11, in a case the direction of the color change is the same when the color is reversed, it is considered that the direction corresponding to the third quadrant corresponds to the first quadrant, and the direction corresponding to the fourth quadrant corresponds to the second quadrant.

Thus, at the step B, the magnitude of the change in color difference is found in each of the X and Y directions and at the step C, it can be concretely recognized that the direction of the color change corresponds to which quadrant. Thus, at the step D, the angle of the direction contained in the quadrant determined at the step C and corresponds to the change in color difference in the X and Y directions from the positive direction of the X direction, for example can be found.

In addition, although it is desirable that the angle showing the direction of the color change is specified at the step D, the present invention is not limited to this. For example, a sign + or −(corresponding to the quadrant determined at the step C) may be added to the ratio of the color difference in each of the X and Y direction.

Furthermore, the color image to be processed by the image processing method may be a whole image generated by the imaging device or an image constituting a part of the whole image.

According to one preferred aspect in the above image processing method, at the step C, regarding the vector showing the direction of the change of the color parameter, the vector corresponding to the third quadrant is determined as a vector reversed in direction and corresponding to the first quadrant, or while the vector corresponding to the first quadrant is determined as the vector reversed in direction and corresponding to the third quadrant, a vector corresponding to the fourth quadrant is determined as the vector reversed in direction and corresponding to the second quadrant, or the vector corresponding to the second quadrant is determined as the vector reversed in direction and corresponding to the fourth quadrant. Thus, two kinds of determination is made such that the direction of the change of the color parameter is determined to correspond to the quadrant in which the signs of the X and Y directions are the same (the first quadrant or the third quadrant) or the quadrant in which the signs of the X and Y directions are different (the second quadrant or the fourth quadrant).

According to another preferred aspect in the above image processing method, at the step C, when the coordinate system defined by the two orthogonal X and Y directions are coordinated to the pixel arrangement in the processing object region, the difference in the color parameter value between two points such as two points on a line parallel to any line among line group connecting the first quadrant and the third quadrant in the coordinate system, and two points on a line parallel to any line among line group connecting the second quadrant and the fourth quadrant in the coordinate system are extracted, and the quadrant corresponding to the vector connecting the two points having a greater difference value is determined as the quadrant corresponding to the vector showing the direction of the change of the color parameter.

For example, regarding two diagonal lines in the processing object region, the difference in color parameter value between two points on each line is found and they can be compared with each other. However, lines to calculate the difference in color parameter is not limited to the diagonal lines, and they may be lines passing through the processing object region and comprising one line that is parallel to a predetermined line connecting the first quadrant and the third quadrant and the other line that is parallel to a predetermined line connecting the second quadrant and the fourth quadrant.

According to another preferred aspect in the above image processing method, at the step C, a determination parameter corresponding to the inner product of a vector that is set to have a component of an amount of change of the color parameter in each of the X and Y directions is found using the data of the pixels in the processing object region and the quadrant corresponding to the vector showing the direction of the change of the color parameter is determined based on the value of the determination parameter.

For example, when it is assumed that the amounts of change in value of the color parameters in the X direction are Rx, Gx and Bx, and the amounts of change in value of the color parameters in the Y direction are Ry, Gy and By, vectors X* and Y* become X*=(Rx, Gx, Bx) and Y*=(Ry, Gy, By), respectively.

Thus, when it is assumed that the determining parameter is Ed, the Ed can be found by the following formula [2].

$$Ed = Rx \cdot Ry + Gx \cdot Gy + Bx \cdot By \qquad [2]$$

Here, it is considered that the change in color is generated when at least one parameter is changed among R, G and B. When this change is generated along the positive direction in both X and Y directions, or when it is generated in the negative direction in both X and Y directions, the product of the components (Rx·Ry, for example) of the changed parameter (R, for example) takes the positive value, it is considered that the determining parameter Ed is also positive.

Meanwhile, when the above change is generated along the positive direction in one of the X and Y directions and along the negative direction in the other direction, since the product of the components of the changed parameter takes the negative value, it is considered that the determining parameter Ed is also negative.

Thus, when the determining parameter Ed takes the positive value, it can be determined that the direction of the color change corresponds to the first quadrant and when the determining parameter Ed takes the negative value, it can be determined that the direction of the color change corresponds to the second quadrant.

According to the image processing method in the present invention, the pixel in which large change in color is generated in the color image can be extracted as the edge point and the direction of the color change can be correctly specified for the extracted edge point. Thus, after the edge code at edge point has been found by the image processing method, the measuring process can be performed as described in the patent documents 1 and 2, so that measuring process can be performed with high accuracy like the case of the monochrome gray image.

Furthermore, an image processing program according to the present invention sets a function to extract a point positioned at the boundary between regions having different colors in the color image, in a computer that can process the color image, and comprises a program for making the computer function as region setting means, color calculating means, determining means, and direction specifying means.

According to the region setting means, focusing on pixels constituting the color image to be processed sequentially, a processing object region having a predetermined size and centering around the focal pixel is set. According to the color difference calculating means, the magnitude of the change in color difference in each of the orthogonal two X and Y directions is found using data of each pixel in the processing object region.

According to the determining means, regarding the processing object region in which the magnitude of the change in color difference in each direction founded by the color difference calculating means corresponds to the magnitude of the change in color difference recognized at the boundary between regions having different colors, the direction of the color parameter change generated based on the pixel in the center of the region is found using data of the pixel in the region, based on at least one color parameter value when color information of the pixel is expressed as three independent color parameters, and it is determined that the vector showing the direction of the change corresponds to which quadrant in a coordinate system defined by the X and Y directions.

According to the direction specifying means, information showing the direction of the color change in the central pixel in the processing object region determined by the determining means is found using the determined result and the magnitude of the change in color difference in the X and Y directions found by the color difference calculating means.

According to the constitution of the program, the step A, the step B, the step C and the step D are executed by the region setting means, the color difference calculating means, the determining means and the direction specifying means, respectively.

In addition, the above program may further include a program for performing a predetermined measuring process using the information found by the direction specifying means.

Furthermore, the above image processing program is stored in the storage medium according to the present invention. In addition, the image processing device according to the present invention comprises the region setting means, the color difference calculating means, the determining means and the direction specifying means.

According to the present invention, since the angle data that reflects the direction of the change in color can be correctly obtained for the edge point in the color image, the measuring process and the determining process can be performed in detail using the angle data.

DESCRIPTION OF THE PREFERRED EMBODIMENTS

(1) Constitution of Image Processing Device

Figure 1:
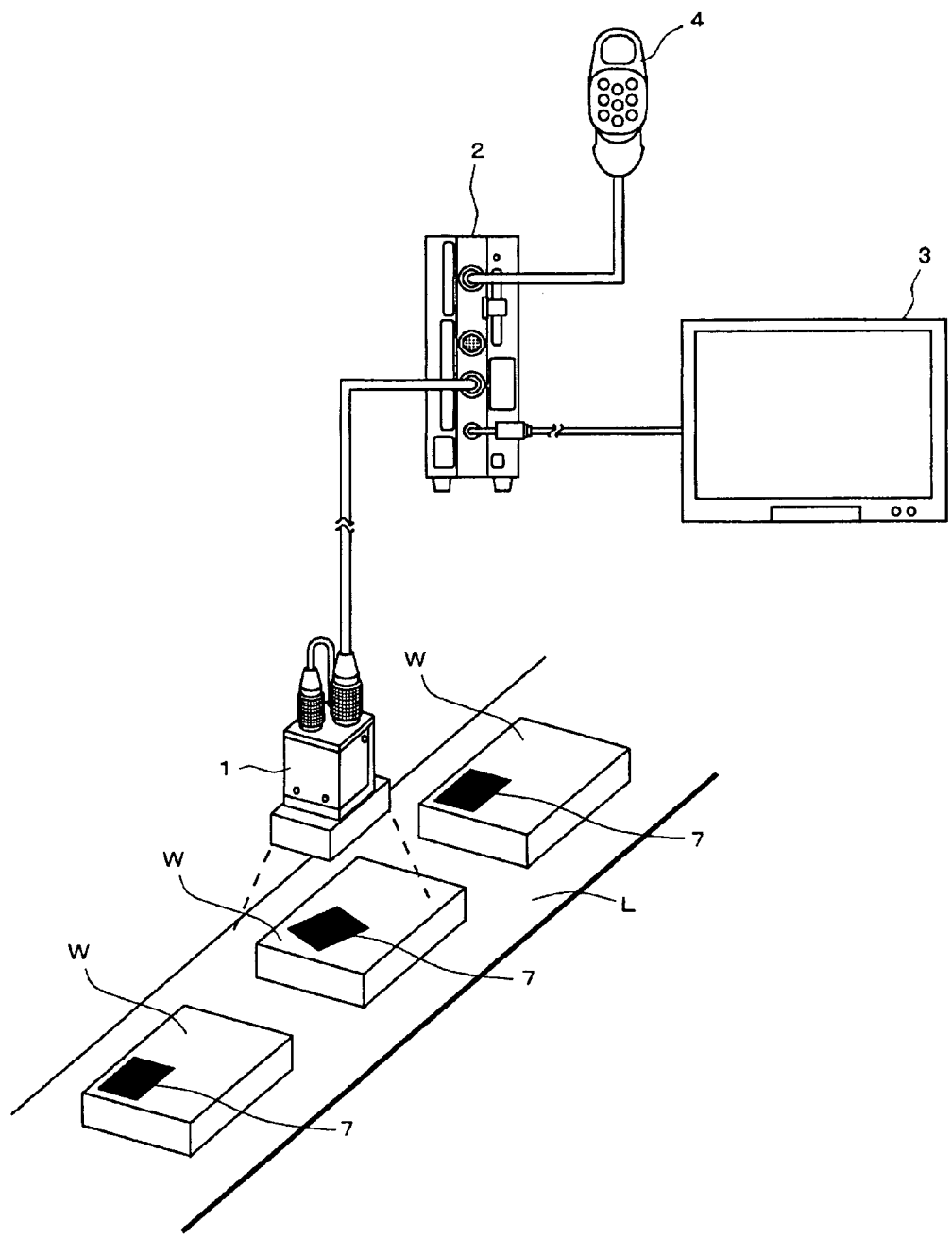
FIG. 1 shows a setting example of an image processing device to which the present invention is applied.

FIG. 1 shows a setting example of an image processing device to which the present invention is applied.

The image processing device in this embodiment comprises a camera 1, a controller 2, a monitor 3, a console 4 and the like and sequentially takes the color image of works W transported along an inspection line in a factory and processes the image to determine whether the position, posture, size and the like of a measurement object 7 (mark, character, defect and the like) on the work W are appropriate or not.

Figure 2:
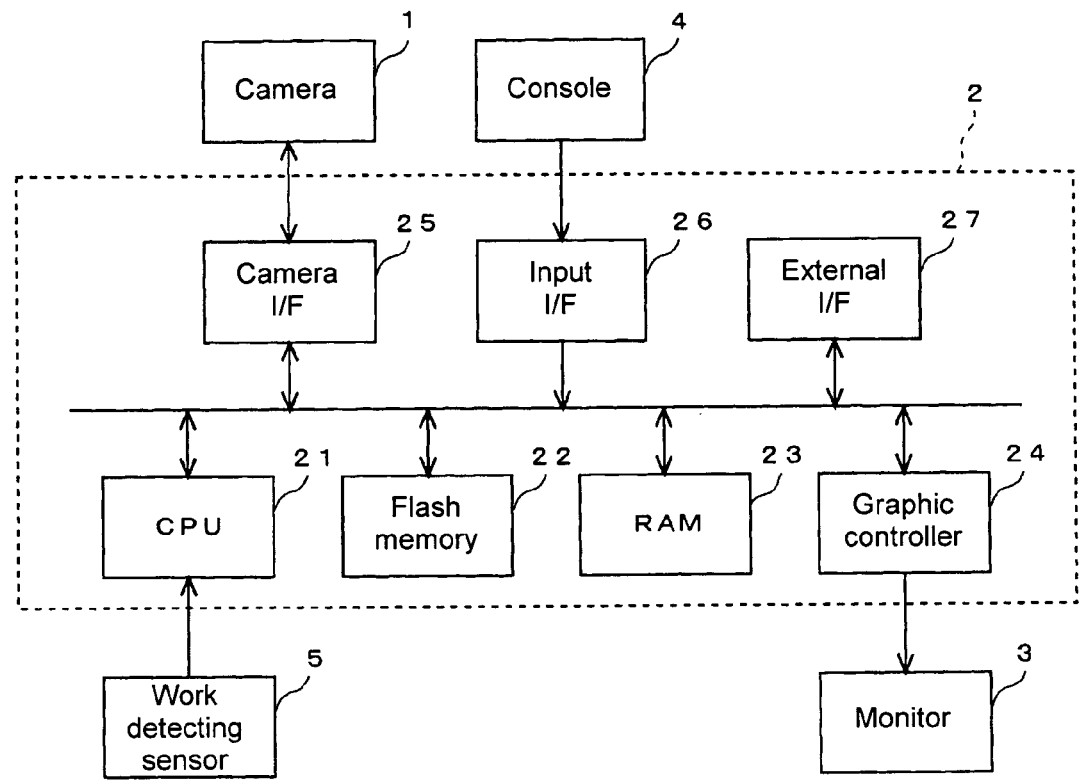
FIG. 2 shows a block diagram of the image processing device.

FIG. 2 shows an electrical constitution of the image processing device.

The controller 2 comprises a CPU 21 as a main controller, a flash memory 22, a RAM 23, a graphic controller 24, a camera interface 25, an input interface 26, an external interface 27 and the like.

In the flash memory 22, a program and a parameter required for the program, process and the like are stored and in the RAM 23, image data or an intermediate operation result and the like are temporally stored.

The camera interface 25 comprises a drive circuit of the camera 1, a buffer for receiving image signals of R, G and B, an A/D converter circuit (which are not shown) and the like. The input interface 26 receives a signal from the console 4. The external interface 27 is used in communicating with an external device (personal computer, PLC and the like) (not shown). The graphic controller 24 executes a display control to the monitor.

A work detecting sensor 5 (optoelectronic switch, proximity switch and the like) is connected to the CPU 21. When the CPU 21 receives a signal indicating that the work W is detected from this sensor 5, it drives the camera 1 with the camera interface 25 and the camera 1 takes the image of the work W. Thus, when the color image of the work W (referred to as the "processing object image" hereinafter) is produced and stored in the RAM 23, the CPU 21 extracts the measurement object 7 and measures the measurement object 7 based on the program stored in the flash memory 22, and determines whether the measurement object is defective or not based on the measured result.

In addition, although the controller 2 shown in FIGS. 1 and 2 is a device developed for the image processing especially, it may be a personal computer in which an image processing program is installed, for example. The program in this case, is provided to the personal computer through a storage medium such as CD-ROM or a communication cable.

(2) Image Processing

The CPU 21 of the controller 2 extracts a point (edge point) positioned at the boundary between colors in the processing object image. Angle data showing the direction of color change is found from the extracted edge point and the measurement object is extracted using the extracted result.

The angle data showing the direction of the color change in the processing object image is called the "edge code" hereinafter and the extracting process of the edge point and calculating process of the edge code by the CPU 21 will be described in detail.

(2)-1 Extracting Process of Edge Point

It is considered that a part in which the color is largely changed becomes an edge in the color image. Thus, according to this embodiment, each pixel is focused on to find a color difference between the pixel and the vicinity of the pixel and when its value exceeds a predetermined threshold value, the pixel is regarded as the edge point.

The color difference is calculated in both X direction and Y direction. Setting the color difference in the X direction to Cx and color difference in the Y direction to Cy, its calculating method will be described in detail hereinafter.

The color differences Cx and Cy are expressed as distances in a color space having axes of R, G and B. More specifically, the color difference Cx is found by formula [3] using amounts of density changes Rx, Gx and Bx of color parameters in the X direction and the color difference Cy is found by formula [4] using amounts of density changes Ry, Gy and By of color parameters in the Y direction. In addition, it can be considered that the Rx and Ry in these formulas correspond to (Ra−Rb) in the formula [1], the Gx and Gy correspond to (Ga−Gb) in the formula [1], and Bx and By correspond to (Ba−Bb) in the formula [1].

[Formula 2]

$$Cx = \sqrt{Rx^2 + Gx^2 + Bx^2} \quad [3]$$

[Formula 3]

$$Cy = \sqrt{Ry^2 + Gy^2 + By^2} \quad [4]$$

To execute the formulas [3] and [4], it is necessary to find the amounts of density changes Rx, Gx, Bx, Ry, Gy, and By. These amounts of density changes can be found by a method of processing image data in a mask centering around the focal pixel with an edge extracting filter similar to the case of the edge extracting process of the monochrome gray image.

Figure 3:
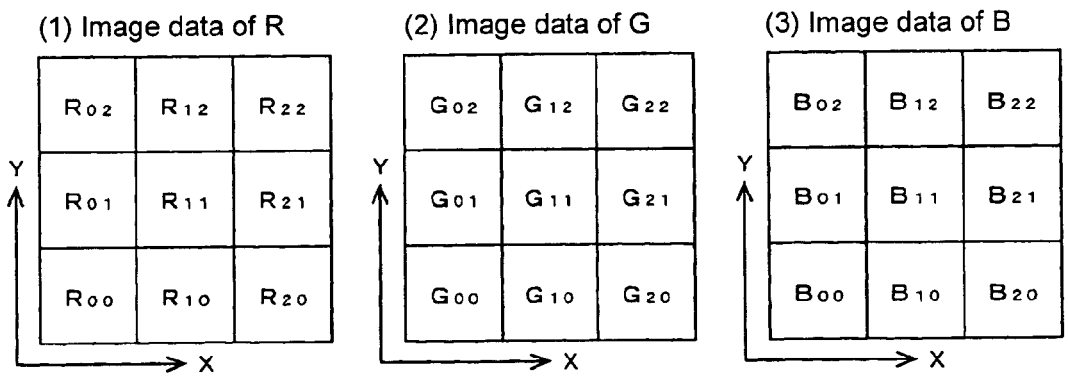
FIG. 3 shows the constitution of image data in a mask.

FIG. 3(1) to (3) schematically show image data with respect to each R, G and B when a mask of 3 pixels×3 pixels centering around the focal pixel. In addition, FIG. 4(1) and (2) show filters using a Sobel operator as an edge extracting filter for the mask. In addition, the edge extracting filter is not limited to the Sobel operator and another filter can be used.

Figure 4:
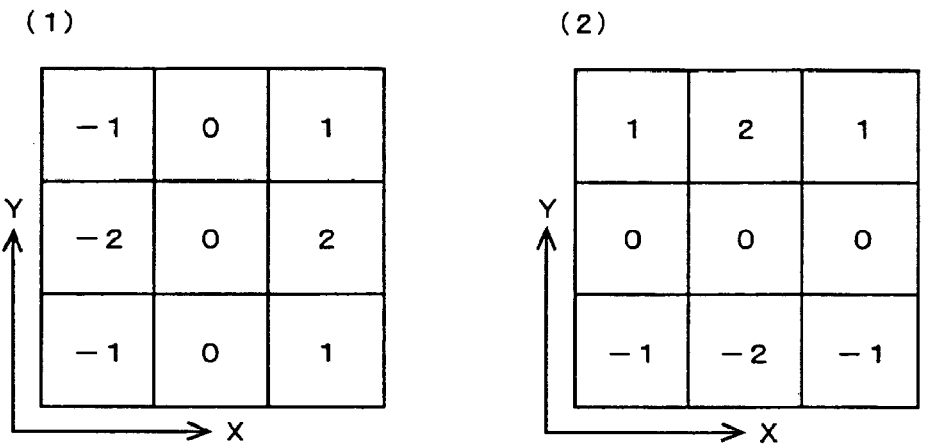
FIG. 4 shows an example of an edge extracting filter for the mask shown in FIG. 3.

The amounts of density changes Rx, Gx and Bx in the X direction can be found by executing a weighted sum operation with the filter shown in FIG. 4(1) for each image data shown in FIG. 3. In addition, the amounts of density changes Ry, Gy and By in the Y direction can be found by executing a weighted sum operation with the filter shown in FIG. 4(2) for each image data.

Thus, while the mask in the color image to be processed is scanned, the amounts of density changes Rx, Gx, Bx, Ry, Gy and By are found with the edge extracting filter with respect to each scanned position, and the formulas [3] and [4] are executed using the above amounts of density changes, whereby the color difference Cx and Cy in the X direction and Y direction can be found, respectively in each constitutive pixel of the color image. Furthermore, according to this embodiment, the pixel having a sum Cl of the color differences Cx and Cy that exceeds the predetermined value corresponds to the edge point.

(2)-2 Calculation of Edge Code

Figure 11:
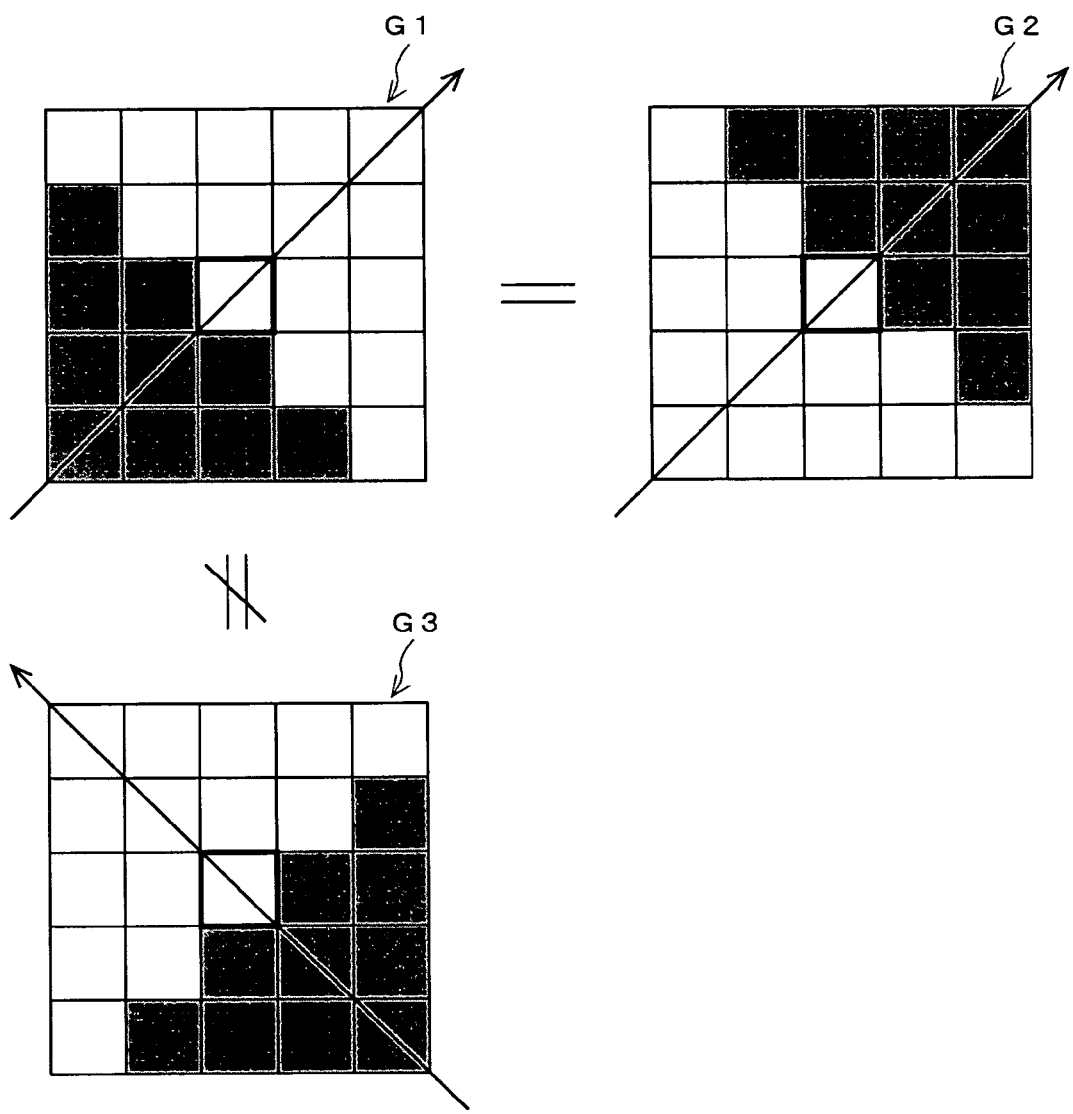
FIG. 11 shows the relation between the distribution state of the color and the direction of the color change in a focal region.

According to the above formulas [3] and [4], although the values of the Cx and Cy are 0 or more constantly, an actual color change is not limited to the positive direction and it appears in the negative direction in some cases. However, like the images G1 and G2 in FIG. 11, when the colors are only reversed, it may be regarded that the direction of the color change is the same. Therefore, it is only necessary to specify the direction of the color change at least in a range from the first quadrant (X>0, Y>0) to the second quadrant (X<0, Y>0) (including X=0 or Y=0).

Thus, according to this embodiment, setting an angle formed between the positive direction of the X axis and the direction of the color change as an edge code EC, the edge code is specified within a range of 0 to 1800.

More specifically, when the direction of the color change appears in the first quadrant, $EC = a\tan(Cy/Cx)$, and when the direction of the color change appears in the second quadrant, $EC = 180° - a\tan(Cy/Cx)$.

In addition, when Cx=0 and Cy>0, EC=90°.

Here, as a method for determining the direction of the color change, two examples will be described. In addition, although in this determining process also, image data in a mask centering around a focal pixel is processed, only a pixel that was determined to correspond to the edge point is focused on here. In addition, although the size of the mask is 3 pixels×3 pixels in the calculation of the amount of density change in order to simplify the description, the size of a mask in the following embodiment is 5 pixels×5 pixels. However, in the actual process, it is desirable that a mask common to both process is set.

<Method 1>

Figure 5:
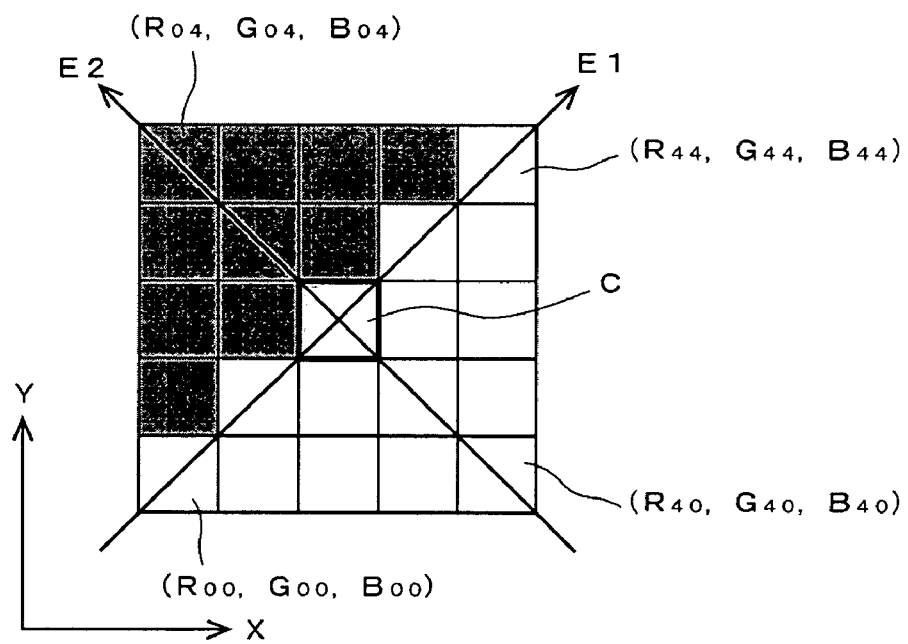
FIG. 5 shows a first method for determining the direction of a color change.

FIG. 5 shows a first method for determining the direction of the color change.

According to this method, the color difference is found with respect to each of two directions E1 and E2 that pass through the pixel C (that has been determined to correspond to the edge point) in the center of the mask and correspond to the first quadrant and the second quadrant, that is, that pass two diagonal lines in the mask, and it is determined that the quadrant corresponding to the direction having a larger color difference corresponds to the direction of the color change.

The direction E1 that heads in the positive direction in both X and Y directions corresponds to the first quadrant. Regarding the direction E1, the color difference between pixels positioned lower left apex and an upper right apex is found using their image data $(R_{00}, G_{00}, B_{00})$ $(R_{44}, G_{44}, B_{44})$.

Meanwhile, the direction E2 that heads in the negative direction in the X direction and in the positive direction in the Y direction corresponds to the second quadrant. Regarding the direction E2, the color difference between pixels positioned lower right apex and a upper left apex is found using their image data $(R_{40}, G_{40}, B_{40})$ and $(R_{04}, G_{04}, B_{04})$.

In the case shown in FIG. 5, since the color change in the direction E2 is larger, it is determined that the color change appears in the second quadrant.

Thus, the direction of the color change can be easily found using the image data at 4 apexes in the mask. However, in a case where the color changes in the directions E1 and E2 are the same, the case is regarded as an exception. For example, when the image data of R, G and B are expressed as 256 tones, if a color distribution shown in FIG. 6 appears in the mask, since the color differences of the directions E1 and E2 are the same, the direction of the color change cannot be specified. Therefore, in this case, the focal pixel is to be removed from the objects to calculate the edge code.

<Method 2>

According to a second method for determining the direction of the color change, a determination parameter Ed is found by applying the amounts of density changes Rx, Gx, Bx, Ry, Gy and By of R, G and B used in extracting the edge point, to the formula [2] (that will be described below again). Then, when the Ed is positive, it is determined that the direction of the color change is generated in the first quadrant and when the Ed is negative, it is determined that the direction of the color change is generated in the second quadrant.

$Ed = Rx·Ry + Gx·Gy + Bx·By$ [2]

In general, it is considered that the color change is generated when at least one of R, G and B is changed. Even when two or more color parameters are changed, they are changed in the same direction in most cases. Even when the changes are generated in the different direction, it is considered that the direction of the most largely changed color parameter corresponds to the direction of the color change. Therefore, it is considered that the sign (+ or –) of the Ed in the formula [2] is determined by the most dominant change among density changes of R, G and B.

For example, when it is assumed that G and B are hardly changed and only R is largely changed, in a case where the direction of the change is generated in the first quadrant or the third quadrant (Rx>0, Ry>0 or Rx<0, Ry<0), since Rx·Ry>0 is implemented, the sign of Ed becomes positive reflecting it.

Meanwhile, in a case where the direction of the change of R is generated in the second quadrant or the fourth quadrant (Rx<0, Ry>0 or Rx>0, Ry<0), since Rx·Ry<0 is implemented, the sign of Ed becomes negative reflecting it.

In addition, since the amounts of density changes (Rx, Gx, Bx) in the X direction correspond to a vector X* in the color space and the amounts of density changes (Ry, Gy, By) in the Y direction correspond to a vector Y in the color space, the Ed expresses the inner product of those vectors. Therefore, when Ed>0, the angle formed between the vectors X* and Y* is less than 90° and when Ed<0, the angle formed between the vectors X* and Y* is more than 90°.

It is considered that the angle formed between the X* and Y* in the color space becomes smaller when the color changes in the X and Y directions are conformed in one direction such as the positive direction or negative direction as compared with the case where one direction is generated in the positive direction and the other direction is generated in the negative direction.

The value of the Ed confirms the above consideration. In this respect also, it can be considered that the quadrant corresponding to the direction of the color change can be correctly determined by the signs of the Ed.

According to the second method, since the determination parameter Ed can be found using the amounts of density changes Rx, Gx, Bx, Ry, Gy and By found in the process for extracting the edge point, the operation time is short and the process can be speeded up.

(3) Flow of Image Processing

Figure 7:
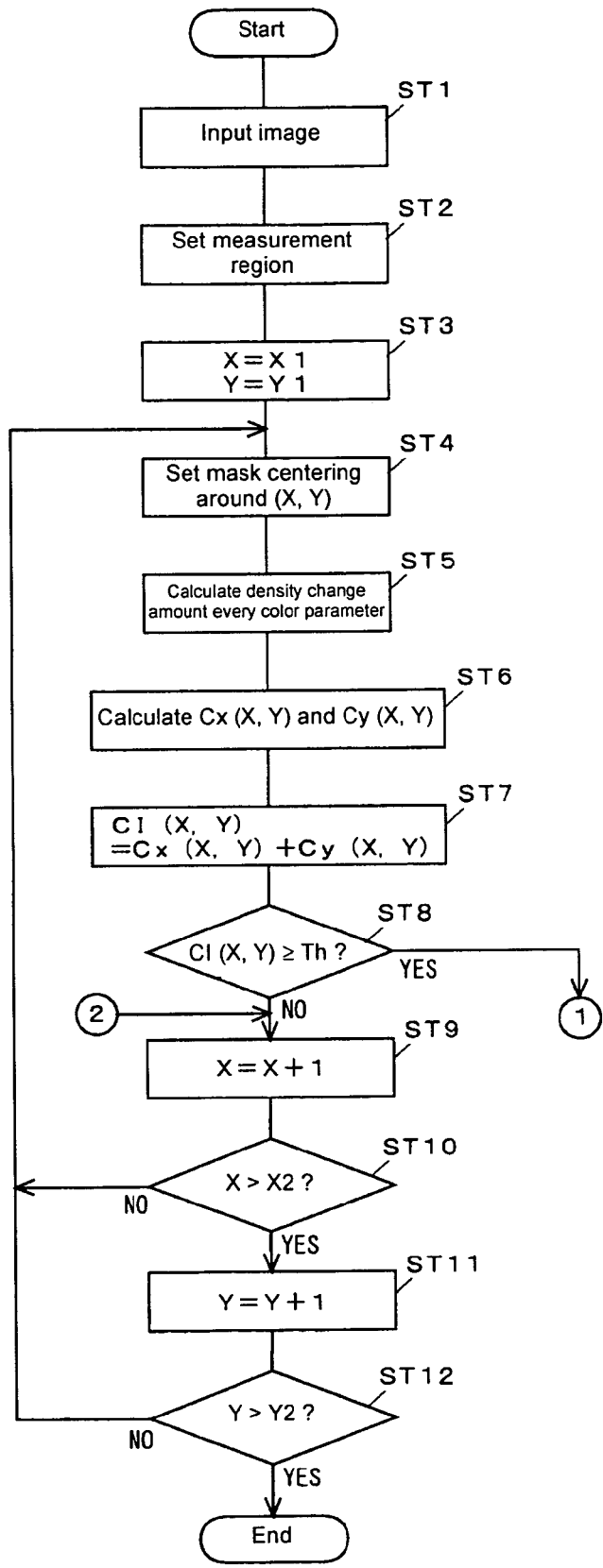
FIG. 7 shows a flowchart showing a process for extracting an edge point and an edge code.
Figure 8:
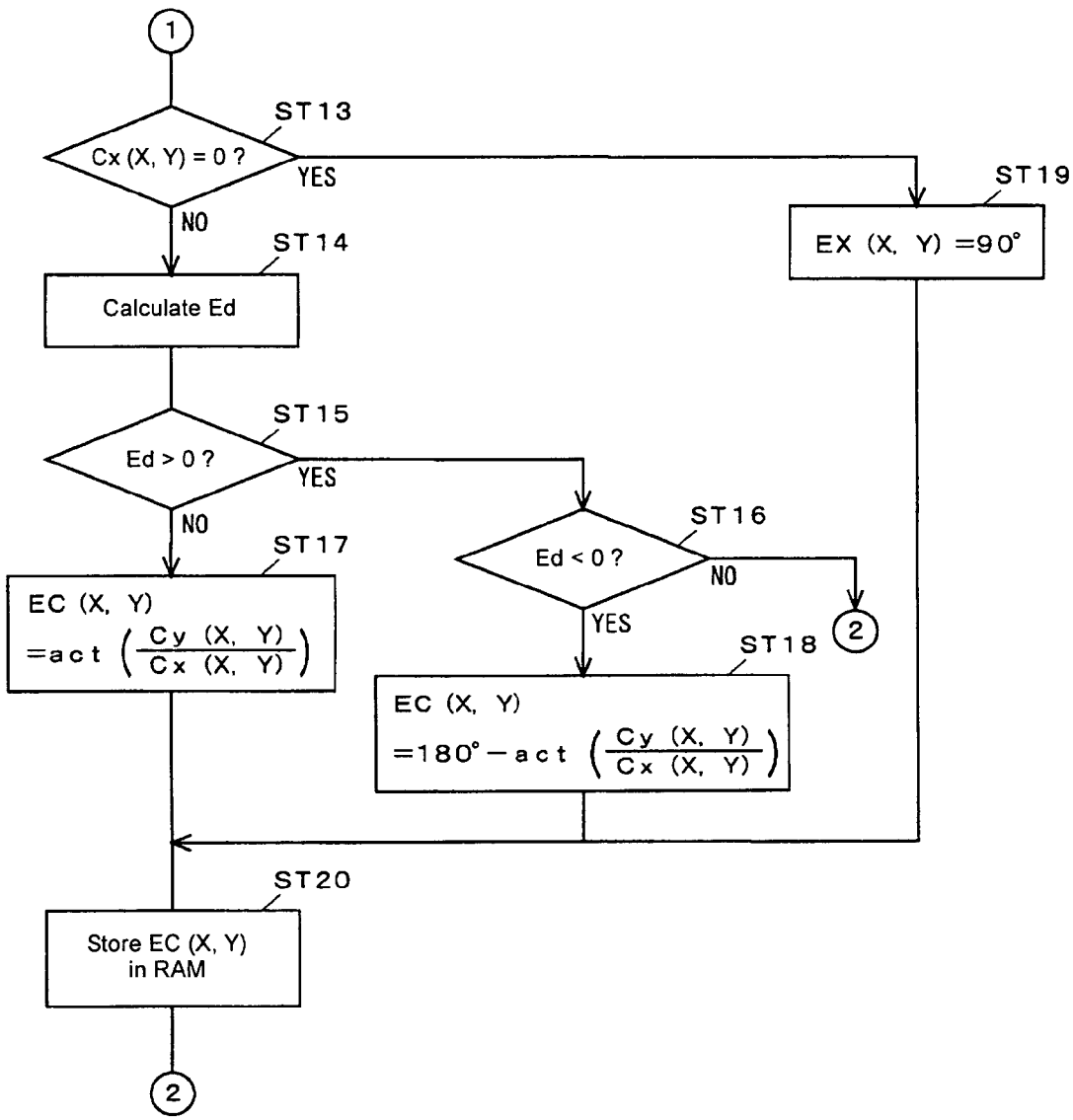
FIG. 8 shows a flowchart continued from FIG. 7.
Figure 9:
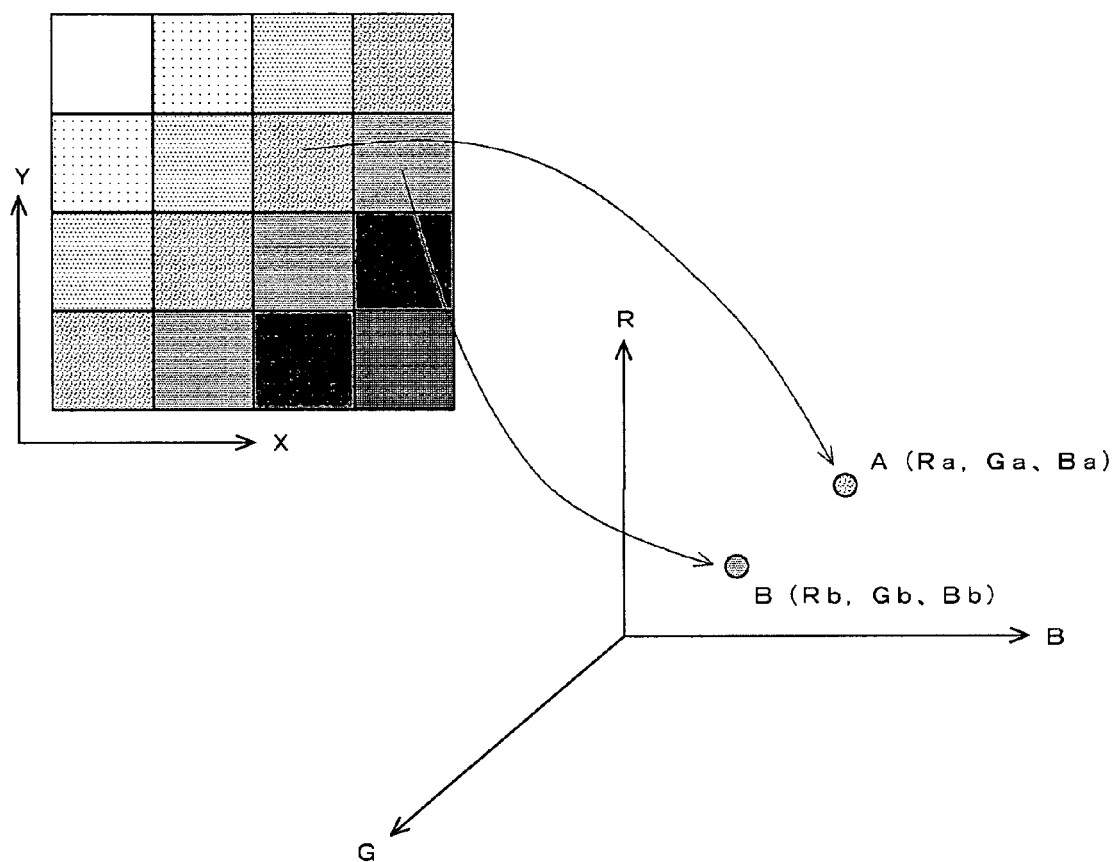
FIG. 9 shows the relation between a color and a color space in a color image.
Figure 10:
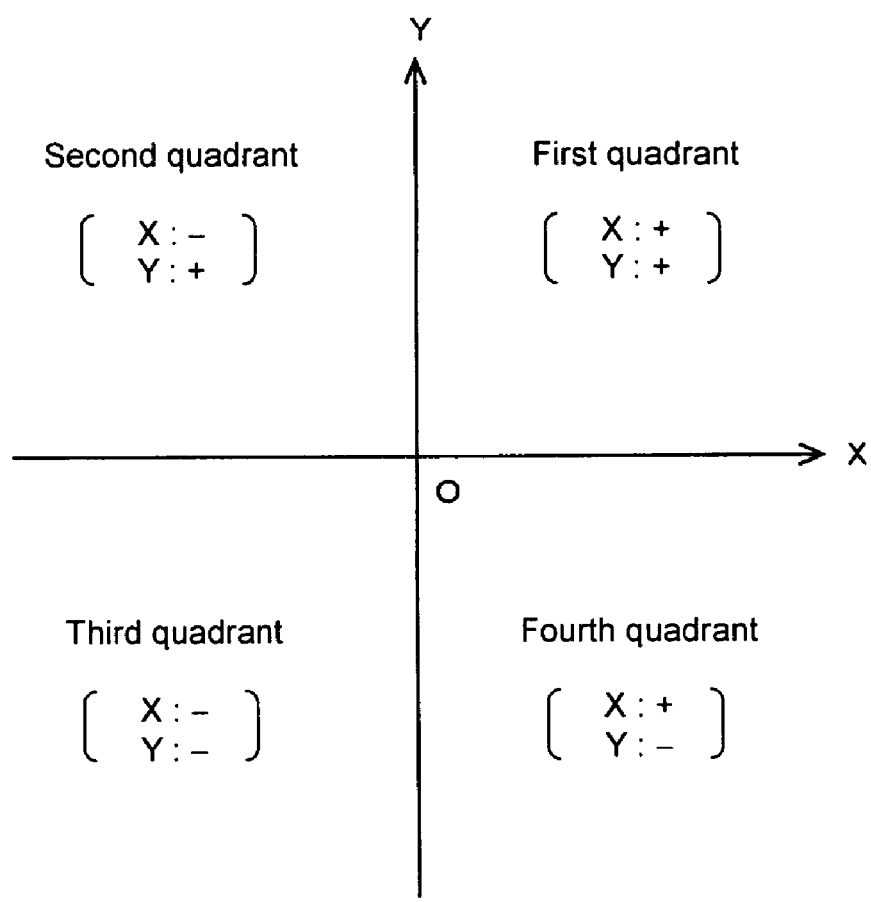
FIG. 10 shows a coordinate system showing the direction of the color change.

FIGS. 7 and 8 show the steps of the process of extracting the edge point for one piece of color image data generated by the camera 1 and the process of finding the edge code. In addition, in this example, the quadrant corresponding to the direction of the color change is determined with the determination parameter Ed. Furthermore, the coordinates of the focal pixel is set to (X, Y), and the Cx, Cy, EC and the like described above are set as functions using the coordinates (X, Y) as arguments.

First, at ST1 (ST stands for step), color image data (combination of image data of R, G and B) generated by the camera 1 and the camera interface 25 is inputted in the RAM 23. At ST2, the measurement object region is set in the color image based on predetermined set data.

At ST3, the coordinates (X1, Y1) that are closest to the origin of the X-Y coordinate system in the measurement object region is set to the initial value of the coordinates (X, Y) of the focal pixel.

At ST4, a mask having a predetermined size is set centering around the coordinates (X, Y). At ST5, with the edge extracting filter, the amounts of density changes Rx (X, Y), Gx (X, Y), Bx (X, Y), Ry (X, Y), Gy (X, Y) and By (X, Y) are calculated in the X and Y directions.

At ST6, the color differences Cx (X, Y) and Cy (X, Y) in the X and Y directions are calculated by applying the calculated each amount of density change to the formulas [2] and [3]. At ST7, the color differences Cx (X, Y) and Cy (X, Y) are added and the added value is set to Cl (X, Y). Here, when the Cl (X, Y) is below a predetermined threshold value, the determination at ST8 is "NO", the process for the focal pixel is completed.

Meanwhile, when the Cl (X, Y) is not less than the threshold value TH, the determination at ST8 is "YES". In this case, the value of the Cx (X, Y) is checked at ST13. Here, when Cx (X, Y) ≠0, the determination parameter Ed is calculated by applying the amounts of density changes Rx (X, Y), Gx (X, Y), Bx (X, Y), Ry (X, Y), Gy (X, Y) and By (X, Y) of the parameters found at the ST5 to the formula [2] at ST14.

Then at ST15 and 16, the value of the determination parameter Ed is checked. When Ed>0, at ST17 and when Ed<0, at ST18, the edge code EC (X, Y) is calculated using the Cx (X, Y) and Cy (X, Y), respectively.

Meanwhile, when it is determined that Cx (X, Y)=0 at the ST13, the EC (X, Y) is set to 90° at ST20.

Thus, when the value of the EC (X, Y) is found, the value of the EC (X, Y) is stored in the RAM 23.

Figure 6:
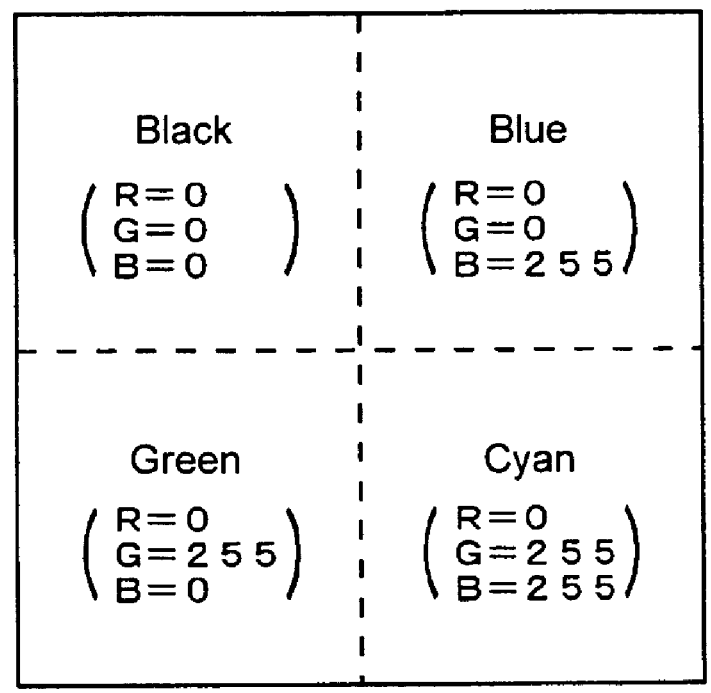
FIG. 6 shows an example in which the direction of the color change cannot be specified.

In addition, when the color distribution as shown in FIG. 6 is generated in the mask, the determination parameter becomes 0. In this case, since the direction of the color change cannot be specified, both determinations at ST15 and ST16 become "NO", so that the process for the focal pixel is completed without calculating the edge code EC (X, Y).

Then, at ST9 to ST12, while the values of (X, Y) are sequentially updated, the same processes as the above are executed to extract the edge point in the measurement region and calculate the edge code EC (X, Y) with respect to each edge point.

When the process for the last coordinates (X2, Y2) in the measurement region is completed, the determination at ST12 is "YES", the illustrated process is completed. Then, the measurement object is extracted using the edge code EC (X, Y) stored in the RAM 23 and a detail measuring process is executed for the object.

According to the extracting process of the measurement object, the same conventional process as that for the monochrome gray image can be performed.

For example, when the pattern having the same configuration as that of a previously registered model is extracted, the distribution pattern of the edge code EC (X, Y) obtained by the above process is to be matched to a reference pattern corresponding to the model (refer to the patent document 1 for details).

When a circular pattern is extracted, a line is set along the direction of the edge code EC with respect to each edge point and the crossing point of the lines of the predetermined number is extracted as the central point of the circular pattern.

In addition, in a case where a linear pattern is extracted, an edge point opposed to the focal edge point is searched along the direction of the edge code EC (X, Y) with respect to each edge point and when the opposed edge point is found, a line having a predetermined length is set along the direction crossing the edge code EC (X, Y) perpendicularly. Then, a region in which the lines of the predetermined number are overlapped is extracted as the measurement object finally (refer to the patent document 2 for details).

In the process for extracting the circular pattern, it is desirable to set lines in both direction of the edge code EC (X, Y) and the direction opposed to that. In the process for extracting the linear pattern also, it is desirable to search the opposed edge point in both direction of the target edge code EC (X, Y) and direction opposed to that. This is because it is necessary to correspond to the case where the colors of the pattern to be extracted and its background are reversed.

For example, when the circular pattern is extracted, in a case where the background is blue and the pattern to be extracted is red, if the direction heading from blue to red is set in the direction of the color change, since the direction heading from the background to the center of the circle and the direction of the color change are the same, the center point of the circle can be extracted. Meanwhile, if the direction heading from red to blue is set in the direction of the color change, since the direction heading from the background to the center of the circle is opposed to the direction of the color change, the center point of the circle cannot be extracted unless the line is set in the direction opposed to that of the edge code EC (X, Y).

Thus, in the process after the edge code EC (X, Y) has been found, since the direction of the color change in the image can be correctly recognized although it is necessary to pay a little attention to it, the object can be recognized or measured with high precision using the algorithm in processing the gray image.

In addition, although the direction of the color change is found as angle information in the above embodiment, instead of this, it may be specified as a combination of the ratio (Cy/Cx) of the color differences Cx and Cy and the positive/negative sign. In this case, the information when the direction of the color change corresponds to the first quadrant is +(Cy/Cx) and the information when the direction of the color change corresponds to the second quadrant is −(Cy/Cx).

What is claimed is:

1. An image processing method for extracting a point positioned at a boundary between regions having different colors, comprising:

using one or more computers to perform the steps of:
- a step A of setting a processing object region having a predetermined size and centering around a pixel that constitutes the color image to be processed;
- a step B of finding the magnitude of change in color difference in each of X and Y directions crossing perpendicularly in the pixel in the center of the processing object region using data of pixels in the region;
- a step C of finding the direction of a color parameter change generated based on the pixel in the center of the region in a processing object region in which the magnitude of the change in color difference in each of the X and Y directions found by the step B corresponds to the magnitude of the change in color difference recognized at the above boundary between the region having the different colors, based on at least one value of a color parameter among three independent color parameters showing color information of each pixel and determining that a vector showing the direction of the change corresponds to which quadrant in a coordinate system defined by the X and Y directions; and
- a step D of specifying a direction of the change in color in the central pixel in the processing object region processed at the step C, using the determination result at the step C and the magnitude of the color change in the X and Y directions found at the step B.

2. The image processing method according to claim 1, wherein at the step C, regarding the vector showing the direction of the change of the color parameter, the vector corresponding to the third quadrant is determined as a vector reversed in direction and corresponding to the first quadrant, or while the vector corresponding to the first quadrant is determined as the vector reversed in direction and corresponding to the third quadrant, a vector corresponding to the fourth quadrant is determined as the vector reversed in direction and corresponding to the second quadrant, or the vector corresponding to the second quadrant is determined as the vector reversed in direction and corresponding to the fourth quadrant.

3. The image processing method according to claim 1, wherein at the step C, when the coordinate system defined by the two orthogonal X and Y directions are coordinated to the pixel arrangement in the processing object region, the difference in the color parameter value between two points such as two points on a line parallel to any line among line group connecting the first quadrant and the third quadrant in the coordinate system, and two points on a line parallel to any line among line group connecting the second quadrant and the fourth quadrant in the coordinate system are extracted, and the quadrant corresponding to the vector connecting the two points having a greater difference value is determined as the quadrant corresponding to the vector showing the direction of the change of the color parameter.

4. The image processing method according to claim 1, wherein at the step C, a determination parameter corresponding to the inner product of a vector that is set to have a component of an amount of change of the color parameter in each of the X and Y directions is found using the data of the pixels in the processing object region and the quadrant corresponding to the vector showing the direction of the change of the color parameter is determined based on the value of the determination parameter.

5. An image processing program, embodied in a non-transitory computer-readable medium, for setting a function to extract a point positioned at the boundary between regions having different colors in the color image, in a computer that can process the color image, comprising a program for making the computer functions as:
- a region setting device for setting a processing object region having a predetermined size and centering around a pixel that constitutes the color image to be processed, focusing on each of the pixels sequentially;
- a color difference calculating device for finding the magnitude of change in color difference in each of X and Y directions crossing perpendicularly in the focal pixel using data of pixels in the processing object region;
- a determining device for finding the direction of a color parameter change generated based on the pixel in the center of the region using the data of the pixels in the region in a processing object region in which the magnitude of the change in color difference in each direction found by the color difference calculating device corresponds to the magnitude of the change in color difference recognized at the above boundary between the region having the different colors, based on at least one value of a color parameter among three independent color parameters showing color information of each pixel and determining that a vector showing the direction of the change corresponds to which quadrant in a coordinate system defined by the X and Y directions; and
- a direction specifying device for finding the information showing the direction of the change in color in the central pixel in the processing object region determined by the determining device, using the determination result and the magnitude of the color change in the X and Y directions found by the color difference calculating device.

6. An image processing device that can process a color image comprising:
- a region setting device for setting a processing object region having a predetermined size and centering around a pixel that constitutes the color image to be processed, focusing on each of the pixels sequentially;
- a color difference calculating device for finding the magnitude of change in color difference in each of X and Y directions crossing perpendicularly in the focal pixel using data of pixels in the object processing region;
- a determining device for finding the direction of a color parameter change generated based on the pixel in the center of the region using the data of the pixels in the region in a processing object region in which the magnitude of the change in color difference in each direction found by the color difference calculating device corresponds to the magnitude of the change in color difference recognized at the above boundary between the region having the different colors, based on at least one value of a color parameter among three independent color parameters showing color information of each pixel and determining that a vector showing the direction of the change corresponds to which quadrant in a coordinate system defined by the X and Y directions; and
- a direction specifying device for finding the information showing the direction of the change in color in the central pixel in the processing object region determined by the determining device, using the determination result and the magnitude of the color change in the X and Y directions found by the color difference calculating device.

* * * * *